United States Patent [19]

Atac

[11] Patent Number: 4,857,740
[45] Date of Patent: Aug. 15, 1989

[54] WIRE CHAMBER

[75] Inventor: Muzaffer Atac, Wheaton, Ill.

[73] Assignee: The United States of America as represented by the United States Department of Energy, Washington, D.C.

[21] Appl. No.: 49,058

[22] Filed: May 12, 1987

[51] Int. Cl.[4] .............................................. G01T 1/185
[52] U.S. Cl. ................................ 250/374; 250/385.1; 313/93
[58] Field of Search ................ 250/385.1, 374; 313/93

[56] References Cited

U.S. PATENT DOCUMENTS

| | | | |
|---|---|---|---|
| 2,654,041 | 9/1953 | McCurdy et al. | 313/93 |
| 2,712,088 | 6/1955 | Whitman | 313/93 |
| 2,715,195 | 8/1955 | Friedman | 313/93 |
| 2,936,388 | 5/1960 | Chubb et al. | 313/93 |

FOREIGN PATENT DOCUMENTS 629317  9/1949  United Kingdom .................. 313/93

OTHER PUBLICATIONS

Atac, "Breakdown Processes in Wire Chambers, Prevention and Rate Capability", IEEE Trans. Nucl. Sci., 31(1), Feb. 1984, pp. 99–106.
Atac et al., "Bi-Dimensional Drift Chambers at Fermilab", Nuc. Instru. and Methods, 156, pp. 163–168, 1978.
Atac et al., "Measurements of Drift Velocities and Lorentz Angles at 15 kG", Nucl. Instru. and Methods in Phys. Research, A249, 1986, pp. 265–276.

Primary Examiner—Carolyn E. Fields
Attorney, Agent, or Firm—Helen S. Cordell; John M. Albrecht; Judson R. Hightower

[57] ABSTRACT

A wire chamber or proportional counter device, such as Geiger-Mueller tube or drift chamber, improved with a gas mixture providing a stable drift velocity while eliminating wire aging caused by prior art gas mixtures. The new gas mixture is comprised of equal parts argon and ethane gas and having approximately 0.25% isopropyl alcohol vapor.

5 Claims, 1 Drawing Sheet

WIRE CHAMBER

CONTRACTUAL ORIGIN OF THE INVENTION

The U.S. Government has rights in this invention pursuant to Contract No. DE-AC02-76CH03000 between the U.S. Department of Energy and Universities of Research Associates, Inc.

BACKGROUND OF THE INVENTION

This invention relates to wire chambers such as single or multi-wire proportional counters, drift chambers, Geiger tubes and the like. These devices are commonly used to detect the passage of a photon or highly energetic subatomic particle through a closed chamber by detecting ionization of a gas within the chamber, caused by absorption of a photon by a gas molecule or a collision between a gas molecule and a subatomic particle.

In general, such wire chambers use at least one anode wire and cathode wires stretched through a chamber filled with a predetermined gas, the valence electrons of which are liberated by absorption of a photon or a collision between a gas atom and a subatomic particle. Electrons liberated from the gas atom or molecule cause the liberation of other free electrons by collisions in a chain-reaction such that an avalanche of free electrons is produced by the initial collision or photon absorption to produce a detectable current surge in one of the electrode wires. All such wire chambers therefore require at least one gas that provides for electron production resulting in an avalanche of such electrons by the absorption of a photon or a collision between an atom of the gas and a subatomic particle of interest. Most wire chambers use at least one additional gas constituent to absorb (quench) ultraviolet photons for prevention of secondary avalanche formation and to stabilize the speed of the avalanche of electrons to improve the timing accuracy of the instrument by providing a more constant velocity of the avalanching electron drift speeds.

It has been found and disclosed that a mixture of argon and ethane gas provides an acceptable electron production characteristic and an acceptable electron drift velocity stabilizing characteristic. See Nucl. Instr. and Methods 156 (1978) 163-168 by M. Atac and J. Urish. and see Nucl. Instr. and Methods in Phys. Res. A 249 (1986) 265-276 by M. Atac et al.

However, a significant problem with wire chamber gas mixtures, has been the additional requirement that ultra-violet photons that penetrate the chamber from a variety of sources across a wide range of wavelengths, be absorbed by the gas, without producing additional ionization in the chamber that would indicate false collisions or events occurring within the chamber. Specifically, energetic photons that strike the cathode wire in a wire chamber will produce free electrons which will result in the production of another avalanche of electrons which will be detected at the anode as another event. These UV photons which strike the cathode wire, if not absorbed by other gases in the chamber, will produce repetitive false counts at the anode wire.

A characteristic of the gas mixture used in wire chambers must therefore be the ability to absorb ultraviolet wavelength photons preventing the false counts that would result from the absorption by the cathode of these UV wavelength photons. It has been found that certain alcohol vapors provide long wavelength UV absorption, which when used in combination with ethane, provides shorter wavelength absorption, the full range of UV wavelengths can be effectively absorbed before the photons impinge the cathode wires used in the wire chambers. See I.E.E.E. Transactions on Nuclear Science, Vol. NS-31, No. 1 (1984) 99-102 by M. Atac.

A substantial problem however in using gas mixtures such as argon and ethane with ethanol or methanol has been that the dissociation products of these alcohols, which are produced by the absorption of a long wavelength ultra-violet photon, are corrosive to the metals used in the wire electrodes and shorten the electrodes useful life by oxidizing the outer layer of the wire surface. Certain metals such as gold, platinum and stainless steel are more resistive to the corrosive dissociation products of ethanol and methanol but are substantially more expensive than other metals that would be useable in a wire chamber were it not for the rapid aging caused by the use of ethanol or methanol with argon and ethane. In complex wire chambers, such as radial wire drift chambers, replacement of wires is prohibitively expensive and time consuming.

It is desirable therefore to be able to operate a wire chamber with a constituent gas mixture that provides a stable electron drift velocity, with the ability to absorb all UV wavelengths without producing dissociation products which cause premature aging of electrode wires.

It is therefore an object of the present invention to provide a wire chamber improved with a gas mixture which prevents premature aging of electrode wires. It is another object of the present invention to provide a wire chamber improved with a gas mixture that provides stable electron drift velocities and good quenching of UV photons across a wide range of UV wavelengths.

Additional objects, advantages and novel features of the invention will be set forth in part in the description which follows, and in part will become apparent to those skilled in the art upon examination of the following or may be learned by practice of the invention. The objects and advantages of the invention may be realized and attained by means of the instrumentalities and combinations particularly pointed out in the appended claims.

SUMMARY OF THE INVENTION

There is provided an improved wire chamber for detecting the passage of subatomic particles or high energy photons, which uses a gas mixture that provides stable electron drift velocity and absorption of undesirable UV wavelength photons, without causing premature aging of anode or cathode wires. A mixture of argon gas and ethane gas in combination with a predetermined concentration of isopropyl alcohol vapor has been found to provide stable electron drift velocity, quenching of UV photons, and a complete elimination of aging of electrode wires caused by corrosive dissociation products of previously used gas mixtures.

DETAILED DESCRIPTION OF THE PREFERRED EMBODIMENT

Figure 1:
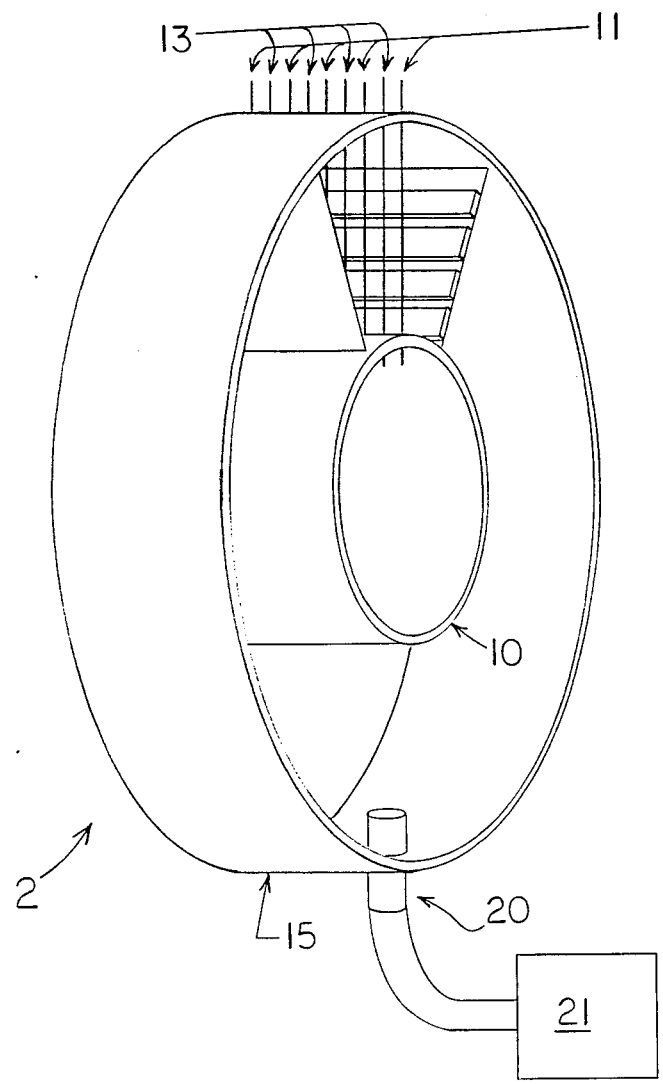
FIG. 1 shows a schematic representation of a radial wire drift chamber, which is a form of multiwire proportional counter, previously known in the art. The drift chamber shown is representative of a wire chamber that would use an ionizable gas and shows the relative positions of electrode wires.

Referring to FIG. 1 there is shown a radial wire drift chamber 2, representative of a wire chamber using anode and cathode wires in an enclosed chamber, filled with an ionizable gas. An inner cylinder 10 and an outer cylinder 15 support a plurality of anode and cathode wires 11, 13 used to produce electric fields, not shown, that enable detection of the passage of a photon or high energy subatomic particle through the region bounded by inner cylinder 10 and outer cylinder 15.

High energy particles or photons traveling through the region bounded by inner cylinder 10 and outer cylinder 15 collide with gas molecules residing within the enclosed volume between inner cylinder 10 and outer cylinder 15 and produce an avalanche of electrons detected at individual anode wires 11 as measurable current surges.

In the apparatus shown in FIG. 1, the volume bounded by inner cylinder 10 and outer cylinder 15 would normally be further enclosed by end caps or covers (not shown) which would enclose the wires and confine the gas. Because of the size of the drift chamber 2, (the diameter of outer cylinder 15 is typically 1-2 meters), and, the number of its constituent elements, leaks in the drift chamber 2, require that a steady flow of gas through the enclosed volume be maintained by an external source 21, to insure that the ionizable gas is maintained within the chamber. Unlike a Geiger-Muller tube for example, which can be completely evacuated and permanently sealed after being charged with gas, the drift chamber cannot practically be sealed and requires a gas continuous flow to insure that the chamber contains the proper atmosphere. Any detecting apparatus, such as a Geiger-Muller tube, or proportional counter requiring an ionizable gas, could use the gas mixture taught herein; those devices, however, that cannot be permanently sealed might require a continuous flow of gas through the device as shown in the apparatus of FIG. 1.

A nozzle 20, shown in FIG. 1 as protruding through the outer cylinder 15, permits the introduction into the region bounded by inner cylinder 10 and outer cylinder 15 (and the end covers not shown) of gas that provides a ready source of easily liberated electrons. Gas source 21 maintains a steady flow of the gas mixture, into the drift chamber 2. The gas from gas source 21 permits production of an avalanche discharge and a stabilization of the drift of the electrons produced in the avalanche, which does not produce dissociation products that corrode or prematurely age the wires 11, 13 shown in FIG. 1.

The preferred embodiment of the gas mixture is comprised of equal portions of argon and ethane gas, mixed together, and, at atmospheric pressure then bubbled through liquid isopropyl alcohol at a temperature of −7° C., thereby adding approximately 0.25% alcohol vapor to the 50% argon, 50% ethane gas mixture. In tests with a radial wire drift chamber, such as that disclosed in FIG. 1 at Fermi National Accelerator Laboratory, aging of aluminum, nickel, copper, stainless steel, platinum, and gold wires was appreciably reduced by eliminating the oxidation of the wire surface caused by dissociation products of previous gas mixtures.

It has been known that isopropyl alcohol dissociates differently from other alcohols such as ethanol or methanol thereby reducing the oxidation of the wire surface.

In the first stage of dissociation, isopropyl alcohol will lose two of its hydrogen atoms and become acetone as follows:

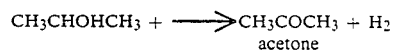
$$CH_3CHOHCH_3 + \longrightarrow \underset{\text{acetone}}{CH_3COCH_3} + H_2$$

As the gas mixture of argon, ethane and isopropyl alcohol flows through the chamber, such as the one shown in the FIGURE, $H_2$ and acetone molecules are vented out of the chamber. In a closed vessel, such as a Geiger Muller tube, these dissociation products harmlessly accummulate within the vessel Previous gas mixtures using methanol and ethanol dissociated into formaldehydes $CH_2O$ and formic acid $CH_2O_2$ and acetaldehyde and acetic acid which resulted in dissociation products which react with aluminum and nickel but not with gold, platinum, and stainless steel. Such is not the case when using isopropyl alcohol as discussed above.

It was experimentally determined that the proportion of argon to ethane should not vary by more than 2% by volume. Deviations beyond 2% of the 50/50 proportion were found to reduce the stability of the electron drift velocity to a point where time resolution of detectable events will be lost.

Pre-mixed argon and ethane is readily available commercially in the recommended 50/50 proportion. The pre-mixed gas is pre-cooled before being bubbled through the alcohol to reduce heating of the liquid alcohol. The flow rate of the gas through the alcohol should be limited to that rate which produces the 0.25% vapor content in the argon/ethane gas mixture.

In tests at the Fermi National Accelerator Laboratory, the 50% argon 50% ethane gas mixture, when bubbled through isopropyl alcohol at −7° C. provided 0.25% alcohol vapor which was sufficient alcohol vapor for quenching of UV photons.

It has been experimentally determined that alcohol temperatures between 0° C. and −9° C. provided useable alcohol vapor concentrations that stopped wire aging. It is believed however that when the temperature of the liquid alcohol is raised substantially above −0° C. the concentration of alcohol vapor increases to a concentration such that the absorption of UV is longer enhanced and the production of secondary avalanche electrons becomes increasingly more inhibited.

Liquid alcohol temperatures and the effect of the alcohol on drift velocity have been measured experimentally. At an electric field strength between wires 11 and 13, as shown in FIG. 1, above 0.95 KV/cm electron drift velocity stabilizes for any alcohol temperature between −1° C. and −9° C. Note however that no tests of the effect of alcohol temperatures on wire aging and electron drift velocity outside these temperature ranges, were performed. It is believed that alcohol vapor concentrations between 1% and 0.25% will stop the aging of wires in proportional counter devices such as the one shown in FIG. 1, as when used with the mixture of argon and ethane gas.

The embodiments of this invention in which an exclusive property or privilege is claimed are defined as follows:

1. A wire chamber capable of converting the passage of subatomic particles and photons through an enclosure into electrical discharges, said wire chamber having a gas, and, at least one positive electrode within said enclosure, and at least one negative electrode within said enclosure the improvement comprised of;

a gas mixture enclosed within said chamber comprised of ethane, argon gas and between 1% and 0.25% isopropyl alcohol vapor.

2. The wire chamber of claim 1 where said gas mixture is, by volume, equal parts of argon and ethane, within 2% and approximately 0.25% isopropyl alcohol vapor.

3. The wire chamber of claim 2 where said wire chamber is a proportional counter.

4. The wire chamber of claim 2 where said wire chamber is a radial wire drift chamber.

5. The wire chamber of claim 4 where said gas mixture is continuously flowed through said wire chamber.

* * * * *